(12) United States Patent
Laceky

(10) Patent No.: US 7,275,501 B1
(45) Date of Patent: Oct. 2, 2007

(54) SYSTEM AND METHOD USING CAPACITORS TO POWER AN AUTOMATIC FEEDER SYSTEM

(76) Inventor: William P. Laceky, 115 Retama Dr., Georgetown, TX (US) 78626

( * ) Notice: Subject to any disclaimer, the term of this patent is extended or adjusted under 35 U.S.C. 154(b) by 50 days.

(21) Appl. No.: 10/885,550

(22) Filed: Jul. 6, 2004

Related U.S. Application Data

(60) Provisional application No. 60/485,300, filed on Jul. 3, 2003.

(51) Int. Cl.
*A01K 1/00* (2006.01)
*H02J 7/00* (2006.01)

(52) U.S. Cl. .............................. 119/57.92; 119/57.91; 320/167; 323/906

(58) Field of Classification Search ................ 323/906; 320/167; 119/51.01, 51.02, 51.11, 51.13, 119/57.1, 57.91, 57.92; 307/29
See application file for complete search history.

(56) References Cited

U.S. PATENT DOCUMENTS

| | | | | |
|---|---|---|---|---|
| 4,616,320 A | * | 10/1986 | Kerr et al. ................... 702/14 |
| 4,686,619 A | * | 8/1987 | Edwards .................... 363/126 |
| 4,720,799 A | * | 1/1988 | Woithe et al. ............... 702/55 |
| 4,785,436 A | | 11/1988 | Sase |
| 4,859,982 A | | 8/1989 | Seaburg |
| 5,143,289 A | * | 9/1992 | Gresham et al. ................ 239/7 |
| 5,426,355 A | * | 6/1995 | Zweighaft .................... 318/364 |
| 5,621,248 A | | 4/1997 | De Villiers |
| 5,783,928 A | * | 7/1998 | Okamura ..................... 320/122 |
| 5,825,157 A | * | 10/1998 | Suzuki ........................ 320/101 |
| 5,828,201 A | * | 10/1998 | Hoffman et al. ............. 320/104 |
| 6,341,354 B1 | * | 1/2002 | Lee ............................ 713/324 |
| 6,367,259 B1 | * | 4/2002 | Timm ........................ 60/641.8 |
| 6,385,069 B2 | * | 5/2002 | Miettinen et al. ........... 363/157 |
| 6,429,621 B1 | * | 8/2002 | Arai ........................... 320/101 |
| 6,448,489 B2 | * | 9/2002 | Kimura et al. .............. 136/244 |
| 6,515,876 B2 | * | 2/2003 | Koike et al. ................ 363/21.16 |
| 6,777,917 B2 | * | 8/2004 | Desprez et al. ............. 320/167 |
| 6,814,029 B1 | * | 11/2004 | Chesser .................... 119/57.91 |
| 6,838,923 B2 | * | 1/2005 | Pearson ...................... 327/309 |
| 6,847,834 B1 | * | 1/2005 | Leem ......................... 455/572 |
| 2002/0084767 A1 | | 7/2002 | Arai |
| 2002/0185074 A1 | * | 12/2002 | Bernard .................... 119/51.01 |
| 2003/0094931 A1 | * | 5/2003 | Renyolds .................... 323/285 |
| 2004/0021446 A1 | | 2/2004 | Bang et al. |
| 2004/0183379 A1 | | 9/2004 | Sinha |

\* cited by examiner

*Primary Examiner*—Karl Easthom
*Assistant Examiner*—Harry Behm
(74) *Attorney, Agent, or Firm*—Johnson & Associates

(57) ABSTRACT

A method and apparatus relates to systems powered by energy stored in capacitors. The capacitors may be charged using any desired power source. The system does not require batteries, which increases the reliability and life span of the system. In one example, an automatic feeder system uses the combination of solar panels and a capacitive network to power the feeder system indefinitely with minimal required maintenance.

18 Claims, 12 Drawing Sheets

SYSTEM AND METHOD USING CAPACITORS TO POWER AN AUTOMATIC FEEDER SYSTEM

CROSS REFERENCE TO RELATED APPLICATIONS

This application claims priority under 35 U.S.C. § 119 to commonly owned U.S. provisional patent application Ser. No. 60/485,300 filed on Jul. 3, 2003 now abandoned, entitled "BATTERY-LESS POWER CONTROL SYSTEM FOR AUTOMATIC GAME AND WILDLIFE FEEDERS", which is incorporated by reference herein.

FIELD OF THE INVENTION

This invention relates to systems that store and use energy. In one example, this relates to automatic feeder systems.

BACKGROUND OF THE INVENTION

There are many applications for automatic feeder systems. Some of these applications include: wildlife feeders, fish feeders, bird feeders, livestock feeders, etc. Automatic feeder systems allow a user to distribute feed such as corn, dog food, fish food, etc., at certain intervals during a day, night, week, etc., or any combination thereof. These systems allow animals to be fed on a regular basis and with a regulated quantity of food without the need for a person to distribute the food.

There are various types of feeders that accomplish this task. Most consist of a food storage device (typically a barrel or bucket) and a distribution device attached to the storage device. The distribution device usually consists of an electrical circuit, a motor, and a spreading or throwing mechanism. The electrical circuit controls when and how long the feed is distributed. The motor, when actuated by the electrical circuit, turns the spreading/throwing mechanism which distributes the feed onto the ground or in the water. Another type of feeder also utilizes a storage device but does not use an electrical circuit or spreading/throwing device. In this case the animal can either nudge the feed out of the storage device and onto the ground or the animal can feed directly from the storage device.

A major drawback to prior art automatic feeders is the required maintenance of the feeder. Most prior art feeders with electrical distribution circuits utilize batteries or solar cells/solar panels or a combination of both battery and solar to power the feeder's electrical circuit and spreading/throwing mechanism. The batteries are a major cause of failure and maintenance. A feeder that uses only batteries without a solar charging device will require the end user to periodically charge the battery. Depending on the duty of the feeder, the user may have to recharge the battery anywhere from daily to yearly. A feeder that uses solar cells/solar panel(s) along with a battery typically requires less maintenance since the solar energy is used to charge the battery during the day and the battery powers the electrical circuit at night. This cycle keeps the battery from completely discharging, eliminating user charging maintenance. However, the physical properties of batteries are such that the battery is typically limited to several hundred recharging cycles. The number of recharging cycles is negatively affected by variations of the ambient temperature surrounding the batteries. Most automatic feeders are used in an outdoor environment where the batteries are exposed to extreme cold and hot conditions. As a result, the batteries typically reach an early end of life ranging from days to several years depending on their usage and environmental surroundings.

SUMMARY OF THE INVENTION

An automatic feeder control system of the present invention includes one or more capacitors coupled to an energy source, a control circuit coupled to the one or more capacitors, and a feed distribution device coupled to the control circuit, wherein energy stored in the one or more capacitors is used to power the control circuit and the feed distribution device.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Generally, the present invention contemplates systems powered by energy stored in capacitors. For example, a system may include an electric motor (or some other device) that draws power from one or more capacitors. In this example, energy stored in the capacitors comes from one or more solar panels. If desired, the system will not utilize any batteries, which increases the reliability and life span of the system. The present invention may be used with any desired system that requires a power source for providing power to a motor, and/or any other power dissipating devices. For the purposes of this description, the present invention will be described in detail in the context of an automatic feeder. Of course, the invention may also be used for any other desired application, as persons of ordinary skill in the art who have the benefit of the description of the invention understand.

In one embodiment, the present invention relates to an automatic feeder system and more particularly to an improved method of providing power to the system. As discussed above, wildlife feeders are well known, but have inherent problems with the power storage robustness and efficiency. The present invention solves these problems with a method of energy storage that is unique to any existing automatic feeder. Careful calculation and design of new advanced capacitive network circuitry is used in the invention to replace the batteries in automatic feeders. This gives a user of the feeder system of the present invention unmatched performance without the need for regular maintenance. The present invention provides several advantages over the prior art including: a longer life compared to systems that rely on rechargeable batteries; no battery maintenance is required; a lighter weight system; superior temperature tolerance; almost unlimited use (charging and discharging); and a system that is more environmentally friendly than battery-based systems.

Figure 1:
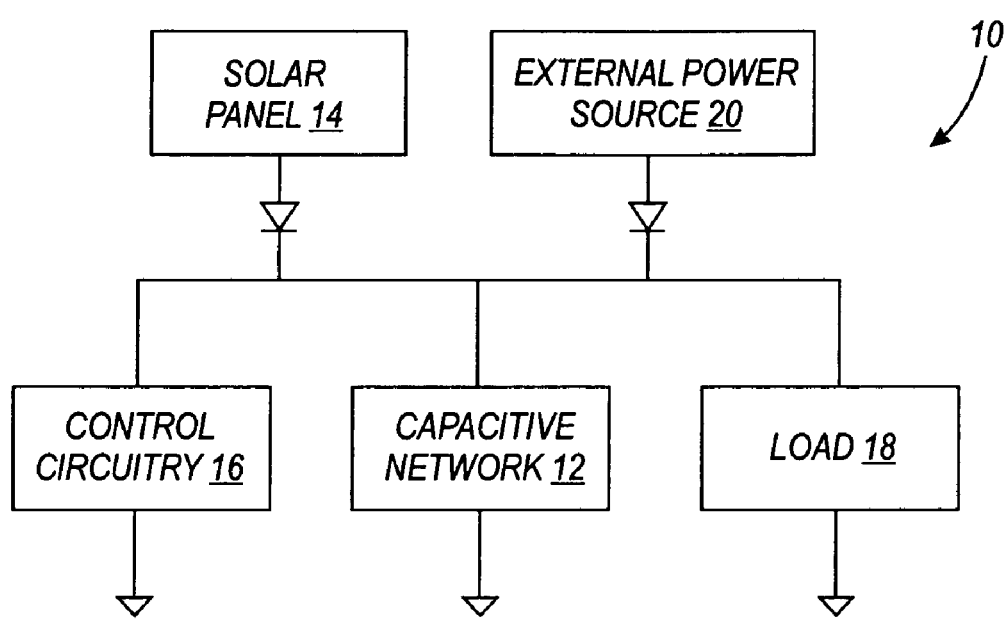
FIG. 1. is a block diagram showing a basic depiction of a system using capacitive energy storage in place of battery energy storage.

FIG. 1. is a basic depiction of a system 10 using capacitive energy storage in place of battery energy storage. FIG. 1 shows a capacitive network 12, which is coupled to solar panel(s) 14. The capacitive network may be comprised of a single capacitor or multiple capacitors. Multiple capacitors could be placed in series, parallel, or in a series-parallel configuration. These configurations could exist as a single configuration or as multiple configurations depending on the voltage and current requirements of the operating circuit. FIG. 1 also shows control circuitry 16 and a load 18 coupled to the capacitive network 12 and solar panel 14. The control circuitry 16 may include circuitry to control the operation of the load, as well as circuitry to control the charging and discharging of the capacitive network 12. FIG. 1 also shows the connection of an external power source 20, which may be used to as an alternative means of charging the capacitive network 12. The external power source 20 may include an external charger, a battery, a fuel cell, a generator, or any other desired device. In the example of an automatic feeder system, the load may include the motor that drives the spreading or throwing mechanism, as well as the control circuitry, displays, keypads, etc. The control circuitry may include circuitry that controls the operation of the system, as well as the circuitry that controls the charging and discharging of the capacitor network.

The present invention greatly reduces the required maintenance of automatic feeders. Capacitor technology using high dielectric films such as, but not limited to "Aerogel" allow large amounts of energy storage to exist in relatively small packages. Capacitors have a much greater (almost infinite) number of charge and discharge cycles compared to batteries. Capacitors are also far less affected by temperature. Using the concepts taught by the present invention, the density of the energy storage of capacitors allows adequate energy storage in capacitor form to replace batteries in automatic feeders. Given the longer life properties of capacitors, automatic feeders using capacitors instead of batteries dramatically reduce required user maintenance. An automatic feeder using capacitors in place of batteries along with an adequate solar cell/solar panel to repeatedly charge the capacitors during the day can be left unattended for years without maintenance. User interaction is reduced to only replenishing the food supply.

One important feature of the present invention is a power storage module using one or more capacitors to store energy. The method use by the invention for storing and delivering the power that controls and delivers feed distribution solves a large problem with prior art automatic feeders. As discussed above, one of the problems with prior art systems is that batteries fail in a relatively short amount of time and require more difficult recharging efforts. The power storage module of the present invention solves this problem with the introduction of capacitive storage. The capacitors used in this invention have a much longer life expectancy than batteries and are much easier to charge. Thus, this invention requires a smaller and less expensive solar panel than other comparable battery operated and solar charged automatic feeders. Also, the capacitors can be discharged completely without any negative effect. Batteries typically cannot be discharged below 80% of their capacity without damage.

While a person skilled in the art could utilize numerous storage modules using capacitors following are some general guidelines for using capacitors in automatic feeder systems.

Typically, capacitors have a working voltage that cannot be exceeded. Capacitors also have an internal series resistance that may be taken into account along with the current demand that will be put on them. Capacitors can be connected in series to increase the stored voltage capability of the network. A series connection comes at the expense of decreasing the capacitance (Farads) of the network. Capacitors, or series strings of capacitors, can be connected in parallel to increase the capacitance value of the overall network.

In the example of an automatic wildlife feeder, a circuit design may be used that involves forming an array of capacitors that can store enough energy for the application. For example, assume a situation where a feeder uses a 6VDC motor to distribute feed, with the motor running a cumulative time of 1 minute at 2 amps during the time between the charging abilities of the solar cell from sunlight (approx. 24 hrs). Also, assume that the capacitors used are 2.5V, 50F capacitors. An example of a suitable 50F/2.5V capacitor is part number B1840-2R5506 manufactured by Cooper Bussman. Other examples of suitable capacitors may include 100F/2.5V part number B1840-2R5107 manufactured by Cooper Bussman and 350F/2.5V part number BCAP0350 manufactured by Maxwell Technologies. Since each individual capacitor is limited to 2.5VDC 3 capacitors in series (and charged to only 6 volts) are can be used to provide the 6VDC supply. Three capacitors in series provide a good margin for voltage variations. However, the total capacitance of the string is decreased by the number of capacitors in series. Therefore, several series strings can be connected in parallel to increase the total overall capacitance. The following equations illustrate this concept.

Equation (1) represents the maximum working voltage resulting from three 2.5VDC capacitors. Note that for a 6VDC motor, the capacitors will only be charged up to 6 volts. Alternatively, a step-down, step-up, or sepic (step-down and step-up) DC-DC converter could be used in order to fully utilize the capabilities of the capacitors.

$$3 \text{ capacitors} \times 2.5\text{VDC} = 7.5\text{VDC maximum working voltage.} \quad (1)$$

Equation (2) represents the total capacitance of the three series connected capacitors.

$$C = \frac{1}{\frac{1}{C1} + \frac{1}{C2} + \frac{1}{C3}} \quad (2)$$

Equation (3) represents the total capacitance from N parallel strings of capacitors, where $C_{S1}$ represents the capacitance of the first string, $C_{S2}$ represents the capacitance of the second string, etc.

$$C = C_{S1} + C_{S2} + C_{S3} + C_{S4} + \ldots C_{SN} \quad (3)$$

Following are equations (4)-(9), described below, may be used to determine the capacitance required for particular applications.

$$\tau c = CR_{esr} \quad (4)$$

$$Q = CE$$

$$V = E - iR_{esr}$$

$$P_{del} = iV$$

$$i = -\frac{dQ}{dt} \quad (5), (6), (7), (8)$$

$$\frac{dQ}{dt} = \frac{1}{2\tau_c}\left[(Q^2 - 4C\tau_c P_{del})^{\frac{1}{2}} - Q\right]. \quad (9)$$

Using the formulas shown in equations (4)-(9), where (C) is capacitance in Farads, (E) is the capacitor emf, (V) is the terminal voltage of the capacitor, (i) is the current, ($P_{del}$) is the power delivered to the load, (Q) is the capacitor charge at time (t), (tc) is the DC time constant, and ($R_{esr}$) is the series resistance, current and voltage values can be solved for at given times (t). These formulas can be used to determine the capacitance required to support the constant power load of an automatic feeder's clock (continuous operation) and motor (during feed distribution times). Once the capacitance requirements are determined, the quantities of series capacitor strings that are parallel connected together to meet this value become evident.

The formulas above can be used to determine the voltage at given points in time during the constant power discharge of the capacitors (the constant power discharge is the power required by the control circuitry of the feeder). To maximize the energy stored in these capacitors, a DC to DC converter can be used to step the capacitor voltage up or down to obtain a steady power supply for the feeder as the capacitor voltages drop. For example, a DC to DC charge-pump or switch-mode circuit could be used convert the 6V capacitor voltage to 6VDC even as the capacitor voltage below 6 volts. This provides the maximum amount of energy from the capacitors to be used for powering the feeder circuits, allowing the designer to minimize the number of capacitors used in the design while maintaining the appropriate duration of available power between re-charges from the solar panel.

Testing shows the design described herein has the ability to fully charge in a matter of seconds with a 6-amp power source. This gives a capacitive feeder system an ability to be fully charged quickly even during weather conditions that provide minimal amounts of sunlight available to the solar panel. This is an improvement feature over prior art feeders that require batteries to be charges from solar panels where the battery may go several days without enough solar power to re-charge, degrading the batteries and sometimes stopping the function of the feeder.

Figure 2:
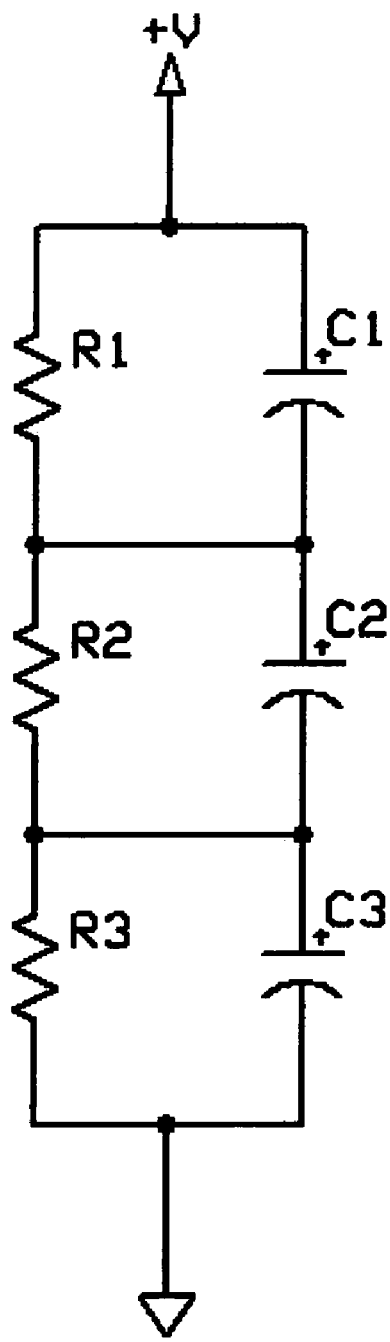
FIG. 2 is a circuit diagram showing a plurality of capacitors connected in series.

Careful design is important when placing capacitances in series. If one or more of the capacitors exhibits lower capacitance, when charging, the voltage stored by that cap can exceed its maximum working voltage. Passive or active balancing can be used to effectively prevent this imbalance of voltages from one capacitor to the next. If imbalance is allowed to occur, this can reduce the life of the capacitor. FIG. 2 is a circuit diagram showing three capacitors connected in series. Connections can be made with other strings to facilitate multiple strings connected in parallel, increasing the duration of the parallel combination. Three biasing resistors R1-R3 are connected as shown to provide passive balancing. The circuit shown uses an equal value resistor connected across each capacitor to form a safe voltage divider and current paths to bleed higher voltages to caps with lower voltages.

It is important to note that you can not simply replace a battery with a capacitor and be able to run an automatic feeder. Capacitors have many differences that require technology advances and significant engineering skills and design work to effectively use them in place of a battery(s).

One significant difference between batteries and capacitors is their energy densities and discharge characteristics. Batteries typically have a nice flat voltage level as they discharge to the end of their capacity. Capacitors have a different discharge profile, where the voltage falls quickly at first then slowing as it is discharged to the end of its capacity. So, for example, a 6V battery used to run a 6V motor in an automatic feeder will provide a good steady 6V to the motor through most of its charge without any additional help. On the other hand, a capacitor or combination of capacitors charged to 6V, running the same motor, will quickly fall to 4V, then 2V, then 1V, etc., as it reaches the end of its charge. A 6V motor will not run very well, if at all, with these low voltages. The results would be badly reduced torque and decreased motor rotation speed as the voltage falls. This makes for uneven feed coverage from the feeder. The circuitry of the present invention overcomes these problems, allowing a feeder to run on capacitors.

Energy density also presents a major challenge when trying to replace batteries with capacitors. Batteries may have much more stored energy than capacitors. For example, a lead acid battery might run a 6V, 3A feeder motor for a couple of hours. A capacitor of similar cost to the that battery might only be able to run that motor for a few seconds before running out of energy. The capacitor alone would not be able to even do this without specially designed conversion circuitry that efficiently takes most of the usable energy in the capacitor and converts it into usable energy for the motor. This is an important aspect of the invention. The clock circuitry preferably should be able to run indefinitely (without power interruption) for years without intervention or help from anyone. It must be able to do this with the only energy source to charge it, being solar energy through a solar panel (photovoltaic). The feeder should achieve this through periods of darkness (due to nighttime and days of heavy cloud cover, rain, and snow). Likewise, the motor should preferably be able to run at a constant speed/torque for a finite amount of time each day in these same conditions to ensure proper and even feed distribution. So, there are significant design challenges in order to achieve this performance given the characteristics of capacitors.

Figure 3:
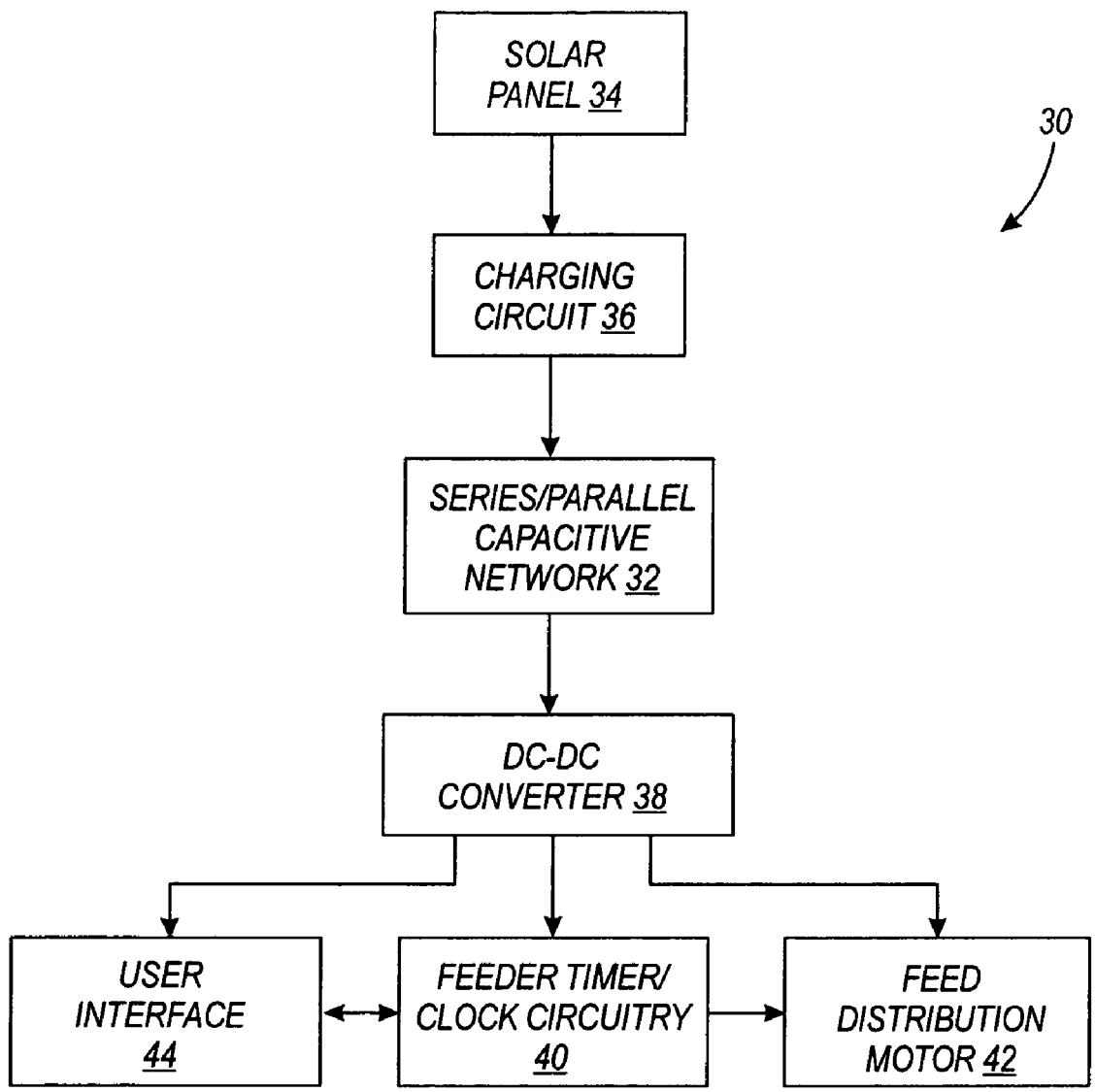
FIG. 3 is a block diagram of an embodiment of an automatic feeder system of the present invention.

FIG. 3 is a block diagram of one embodiment of an automatic feeder system of the present invention. This example describes an automatic feeder, but the is not limited to the example shown. FIG. 3 shows a block diagram of an automatic feeder system 30. The system 30 includes a series/parallel capacitive network 32, such as the network described above. A solar panel 34 is used to charge the capacitive network 32. A charging circuit 36 (described in detail below) is used to control the charging of the capacitive network 32. A DC-DC converter 38 is used to step the capacitor voltage up or down to obtain a steady power supply for the feeder as the capacitor voltages drop. The DC-DC converter provides a voltage to both the feeder timer/clock circuitry 40 and the feed distribution motor 42. FIG. 3 also shows a user interface block 44, which may include a display, lights, switches, keypad, etc., for use by a user to control the operation of the system 30.

Figure 4:
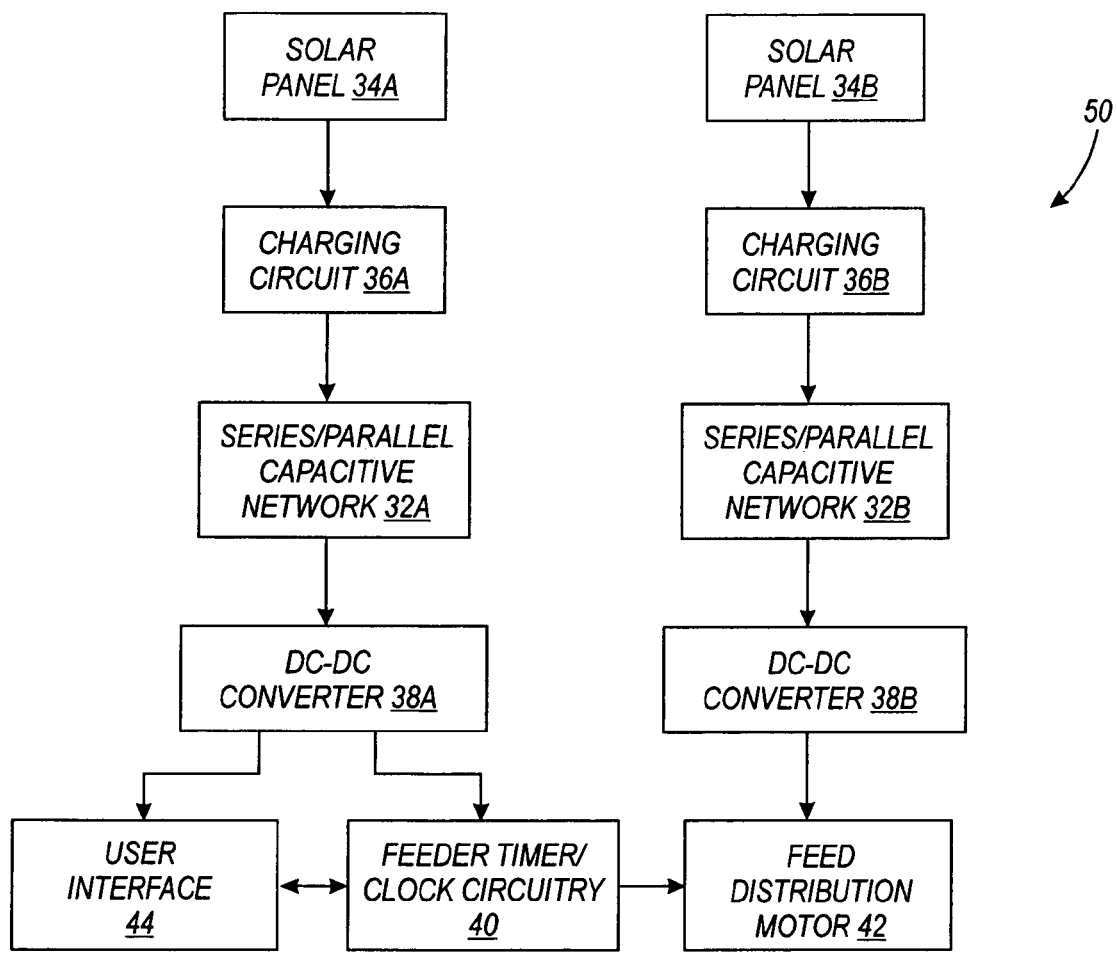
FIG. 4 is a block diagram showing another embodiment of an automatic feeder system of the present invention.

FIG. 4 is a block diagram showing another embodiment of an automatic feeder system. FIG. 4 shows a block diagram of an automatic feeder system 50 that is similar to the system shown in FIG. 3, with separate capacitive networks and solar panels for the feed distribution motor and control circuitry. The system 50 includes first and second series/parallel capacitive networks 32A and 32B. First and second solar panels 34A and 34B are used to charge the capacitive networks 32A and 32B, respectively. Charging circuits 36A and 36B are used to control the charging of the capacitive networks 32A and 32B, respectively. A first DC-DC converter 38A provides a voltage to the feeder timer/clock circuitry 40 and user interface 44. A second DC-DC converter 38B provides a voltage to the feed distribution motor 42. By separating the source of power to feed distribution motor and the control circuitry, the reliability of the system is increased. In a feeder system, it is desired that the timer remain powered at all times. If, for some reason, the capacitive network 32B is completely drained after running the motor 42, there will still be sufficient power stored in capacitive network 32A to maintain the timers and clocks needed to maintain the desired operation of the system. Without this separation, the motor could rob the timer of needed energy. Separate solar panels help ensure that there is plenty of energy available from sunlight during cloudy days to fully charge both capacitor banks. If desired, with either embodiment, a battery could be used as a backup power source in the event that energy stored in the capacitors is depleted. Of course, a single solar panel and single capacitor bank (e.g., see FIG. 3) could be used to power both motor drive and the timer, but that would make careful capacitor bank sizing and cutoff circuitry desirable to ensure plenty of energy was left for the timer.

Figure 5:
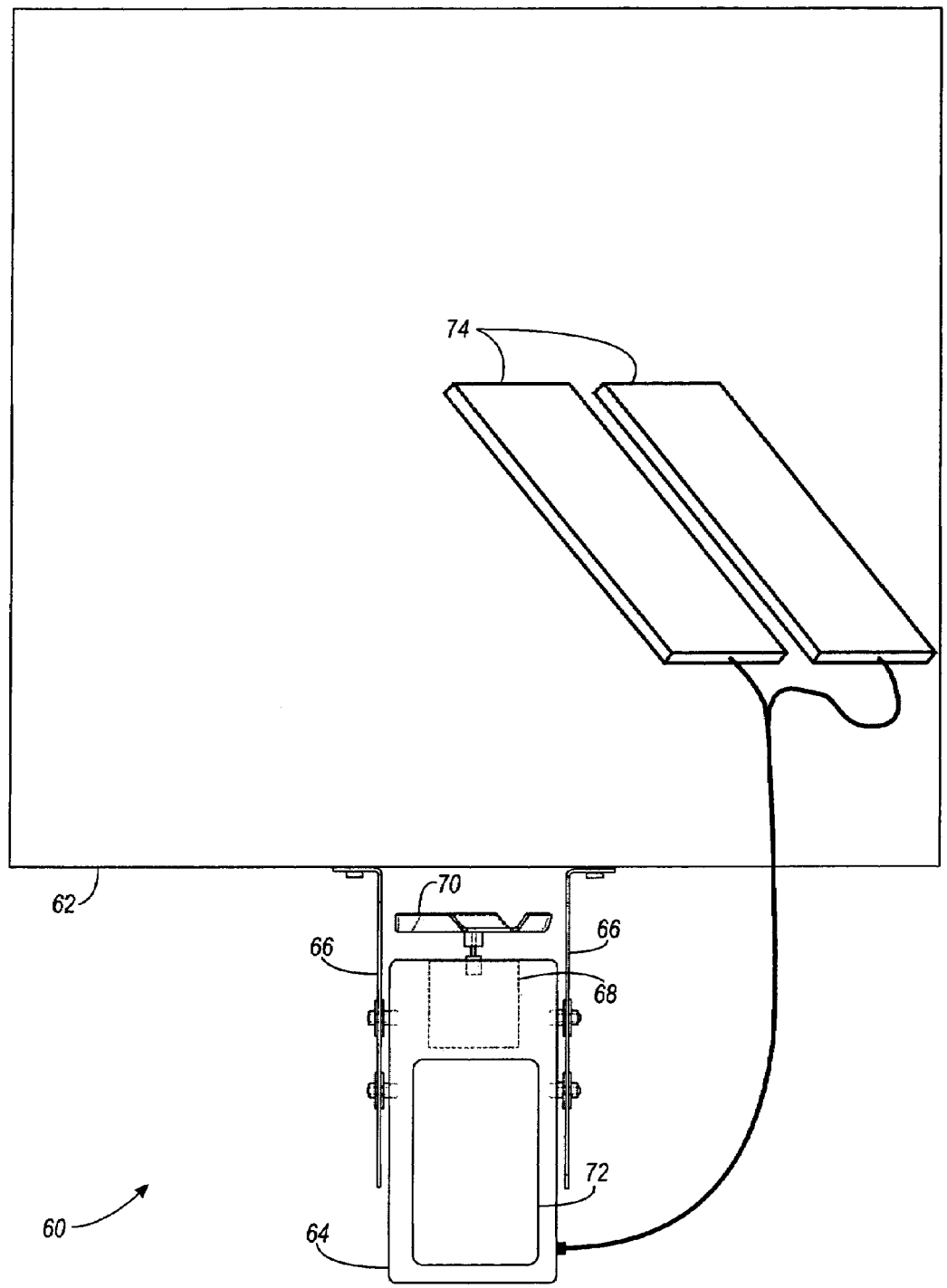
FIG. 5 is a front view of an embodiment of an automatic feeder system of the present invention.

FIG. 5 is a front view of an embodiment of an automatic feeder 60 of the present invention. The automatic feeder 60 has a food storage bin 62 for storing the food to be spread by the feeder 60. A housing 64 is mounted below the bin 62 via mounting brackets 66. The housing 64 houses a motor 68 which is coupled to a feed distribution device 70, in this example, a rotatable tray. The housing 64 includes a door 72, or access panel which provides access to the interior of the housing 64 and/or to user interface devices (e.g., switches, keypad, display, lights, etc.). The automatic feeder 60 also includes solar panels 74 for providing power to recharge the capacitive network(s). Other components (e.g., various circuitry, capacitors, etc.) of the automatic feeder 60 are disposed within the housing 64, which provide a weather proof enclosure.

Figure 6:
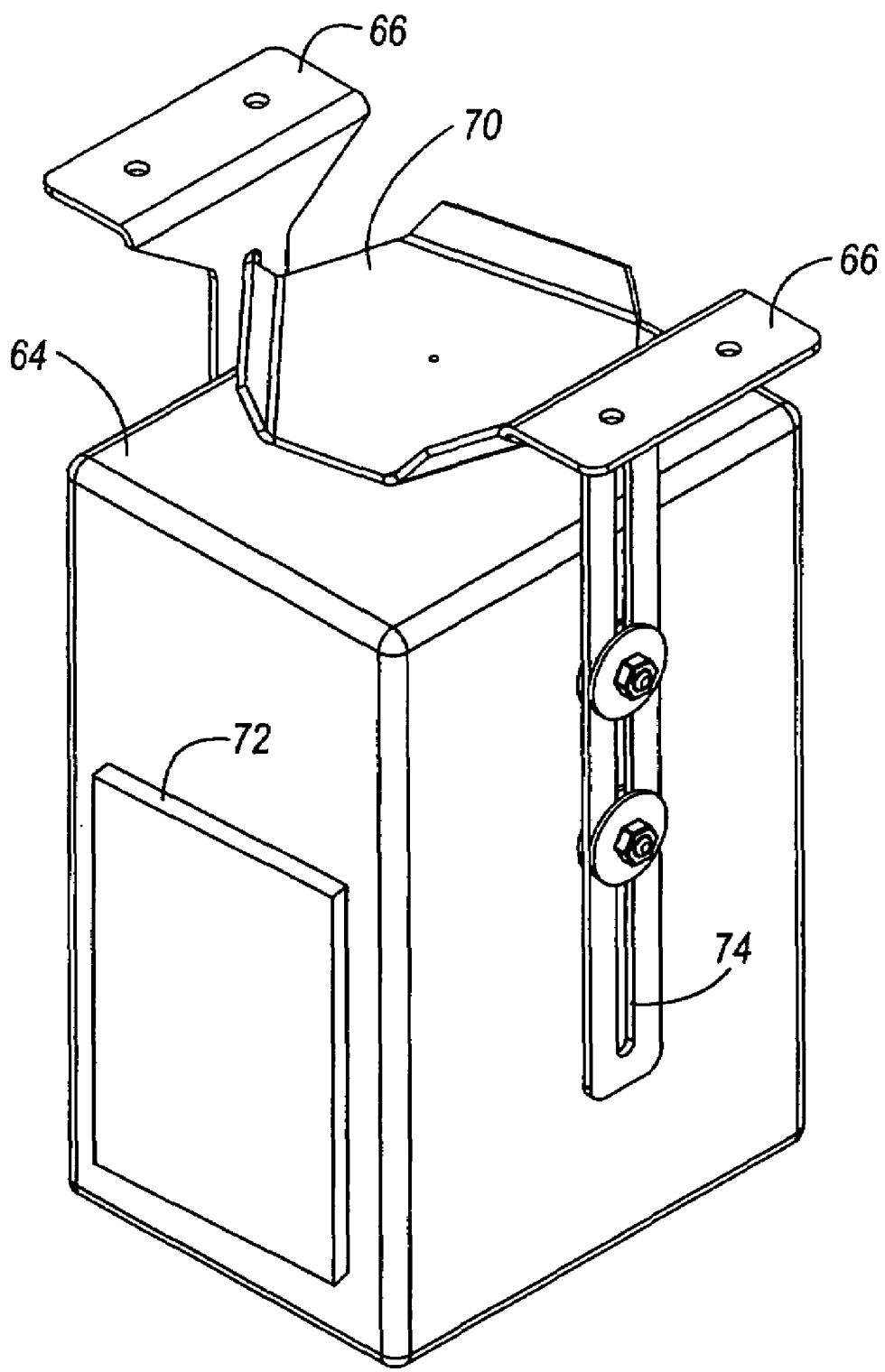
FIG. 6 is an enlarged isometric view of a housing for an automatic feeder system.

FIG. 6 is an enlarged isometric view of the housing 64 and associated components, such as door 72, brackets 66, and feed distribution device 70. The brackets 66 are adapted to be bolted to the bottom surface of the bin 63 (FIG. 5). The distance between the bin 62 and the feed distribution device 70 is adjustable due to the grooves 74 formed in each of the brackets. The bin 62 includes an opening (not shown) that allows food to flow from the bin 62 to the rotatable tray. When the tray is not spinning, the food will pile up and stop the flow. When the tray rotates, food will flow through the opening until the tray stops. Note that various other feed distributions device arrangement can also be used.

Figure 7:
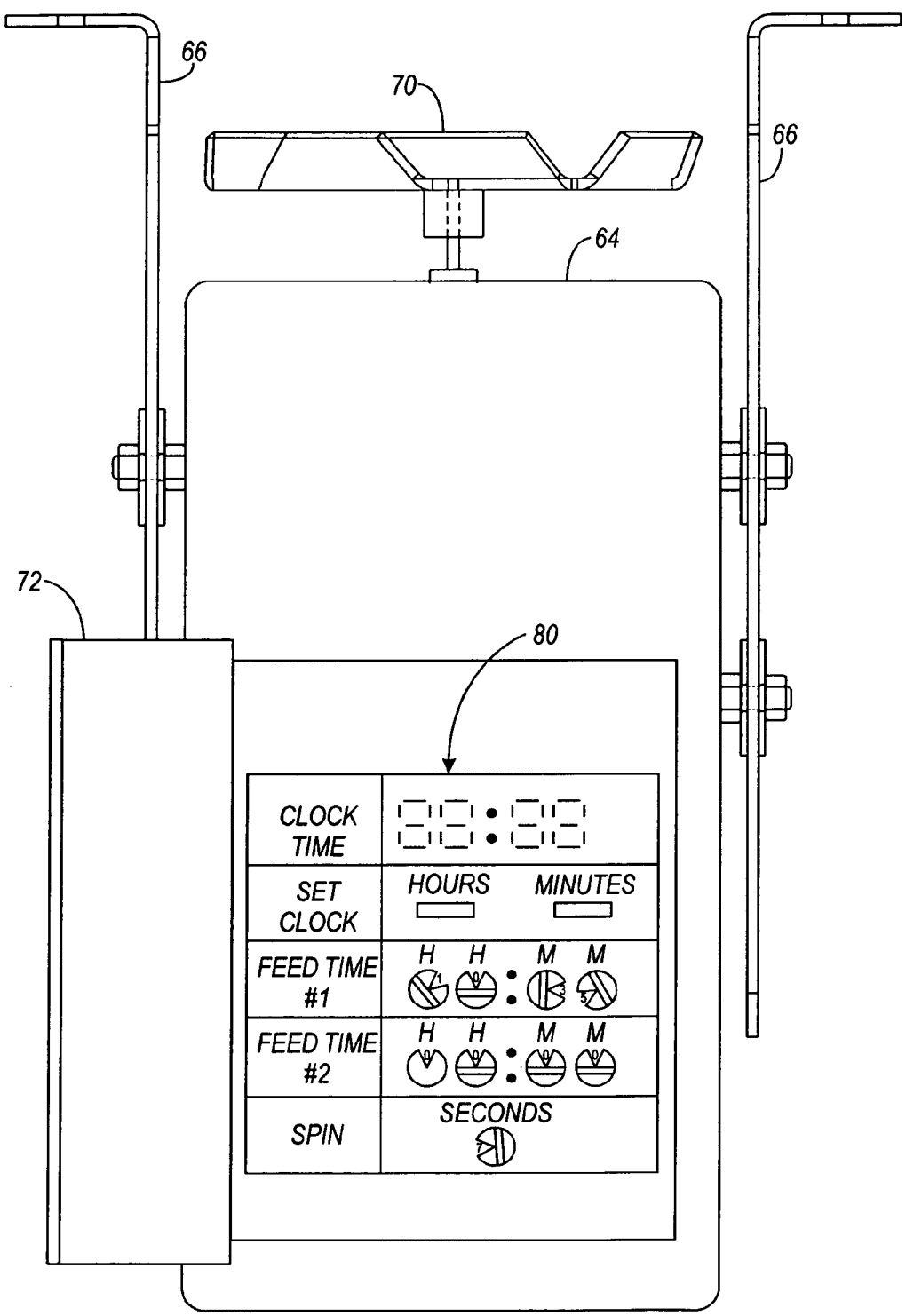
FIGS. 7-8 are enlarged views of housings for an automatic feeder system.
Figure 8:
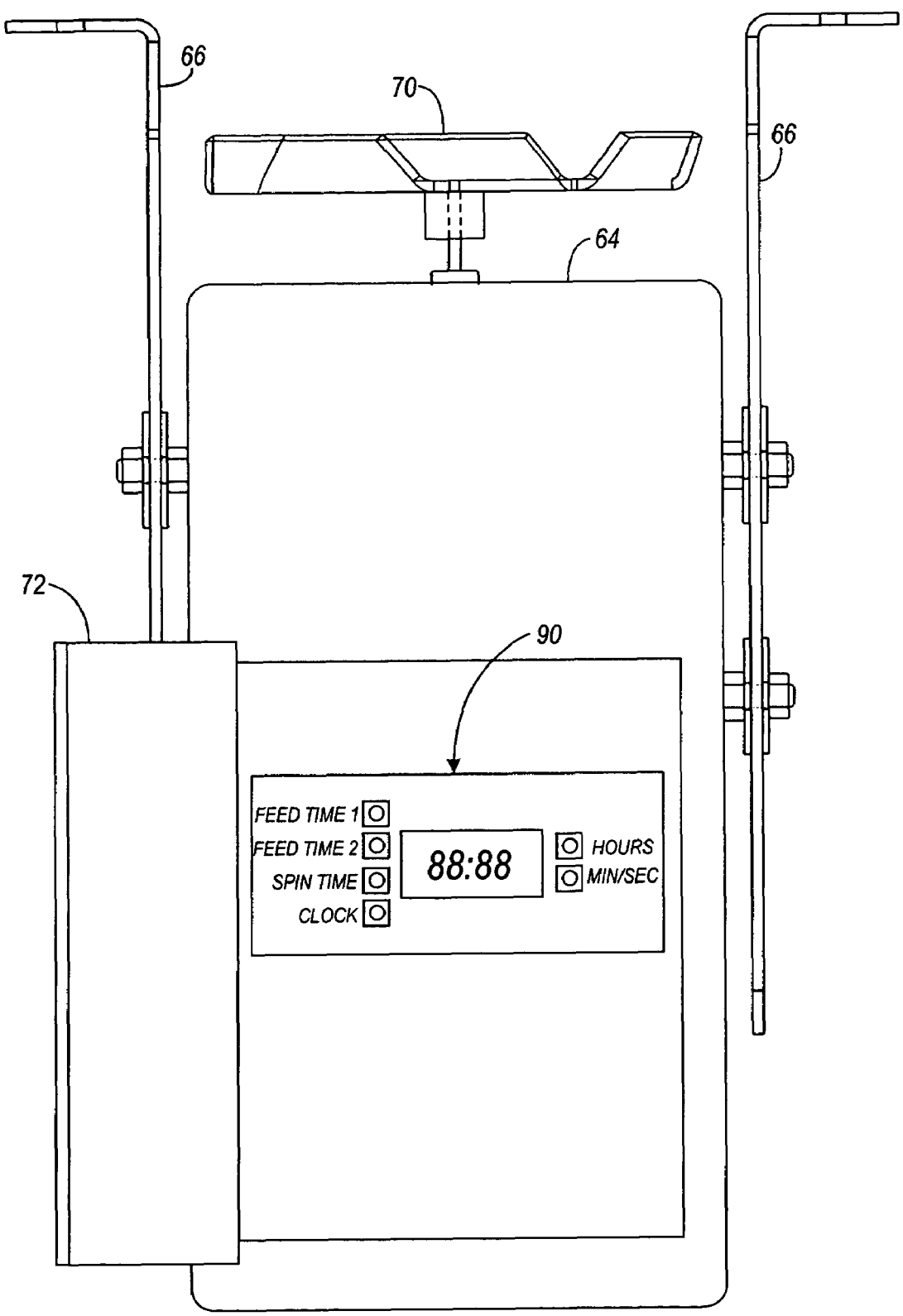

FIGS. 7-8 are views showing the housing 64 with the door 72 open, exposing exemplary control panels. FIG. 7 shows a control panel 80, which includes a clock display for showing the time of day. Below the clock display are clock set buttons (shown as "hours" and "minutes") for setting the time of day. The control panel 80 includes mechanical switches for setting up to two feeding times. In this example, a first feeding time is set to 10:35 am. Also in this example, the second feeding time is disabled by setting the switches to all zeros. The control panel 80 also includes a switch for setting the duration of rotation of the feed distribution device 70. In this example, the duration has been set to 7 seconds. Following is a description of the operation of an automatic feeder that has been configured as shown in FIG. 7. During daylight hours, the solar panels will charge the capacitive network using a charging circuit. The capacitive network supplies power to the feeder timer and clock circuit during day and night. At 10:35 am, the control circuitry activates the feed distribution motor, which rotates the feed distribution device 70, throwing feed as it flows from the bin. After 7 seconds, the feed distribution motor is turned off and the flow of feed stops.

FIG. 8 shows a control panel 90, which includes a display and six push buttons used for programming the automatic feeder. In this example, a first feeding time is programmed by pressing the "HOURS" and "MIN/SEC" buttons to adjust the hours and minutes appropriately, while holding down the "FEED TIME 1" button. The second feed time, spin duration, and time of day settings are programmed in the same manner.

The present invention provides a battery-less feeder system using solar energy that is stored and converted to run a motor under constant/regulated voltage and current requirements for defined periods of time. The invention provides a system that runs electronic circuitry such as digital clock circuitry, motor control circuitry, and data storage circuitry, indefinitely without power interruption using a combination of stored solar energy and direct solar energy. Following are more details relating to circuitry used to achieve goals of the present invention, as well as overcome various challenges mentioned above.

Figure 9:
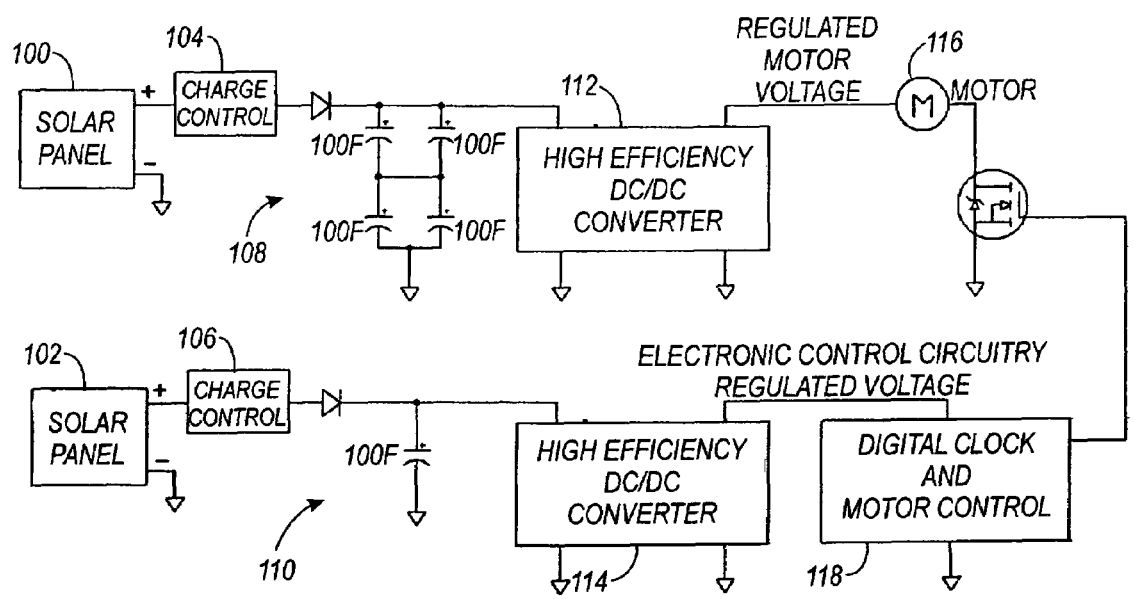
FIG. 9 is a block diagram illustrating circuitry for powering a motor and for powering other circuitry using energy stored in capacitive networks.

FIG. 9 is a block diagram illustrating circuitry for powering a motor and for powering other circuitry using energy stored in capacitive networks. Like in FIG. 4 (described above), in the example shown in FIG. 9, separate solar panels and capacitive networks are used to power the motor and other circuitry. FIG. 9 shows for and second solar panels 100 and 102 that provide power to charge control circuits 104 and 106, respectively. The solar panels 100 and 102 are ideally sized to provide enough charge (under low light) to run the motor or control circuitry for a desired time between charging periods. The charge control circuits 104 and 106 measures the capacitor charge voltage and protects the capacitors from charging to damaging voltage levels. The charge control circuits do this by shunting the solar panels output away from the capacitor(s) when the voltage reaches an ideal voltage (described in more detail below). The charge control circuits re-connect the solar panels when the capacitor voltage falls below the ideal voltage. In FIG. 9, the capacitive networks 108 and 110 are used to store solar energy collected during the daylight. At night or during low light level conditions, the capacitor networks provide enough energy to keep the clock and control circuitry powered (without interruption) until the solar panel can provide a recharge. As a result, the capacitor networks must be sized accordingly.

The DC-DC converter 112 converts the capacitor voltages to a usable voltage for the motor 116. Similarly, DC-DC converter 114 converts the capacitor voltages to a usable voltage for the timer and motor control circuitry 118. The DC-DC converters 112 and 114 receive energy from both the solar panels 100 and 102 and capacitive networks 108 and 110 during daylight and from only the capacitive networks 108 and 110 during nighttime. The energy stored in the capacitive network 106 keeps the control circuitry powered indefinitely by using most of the available energy in the capacitors (even down to low voltages). The DC-DC converter 112 also provide a nicely regulated voltage output at the appropriate level for a given motor to maximize the torque. The timer and motor control circuitry 118 may include an LCD display for showing the time of day and the programmed times for feeding. The timer and motor control circuitry 118 also may include a user interface for the user to custom program feeding times as well as the duration of motor activation during a feed.

Figure 10:
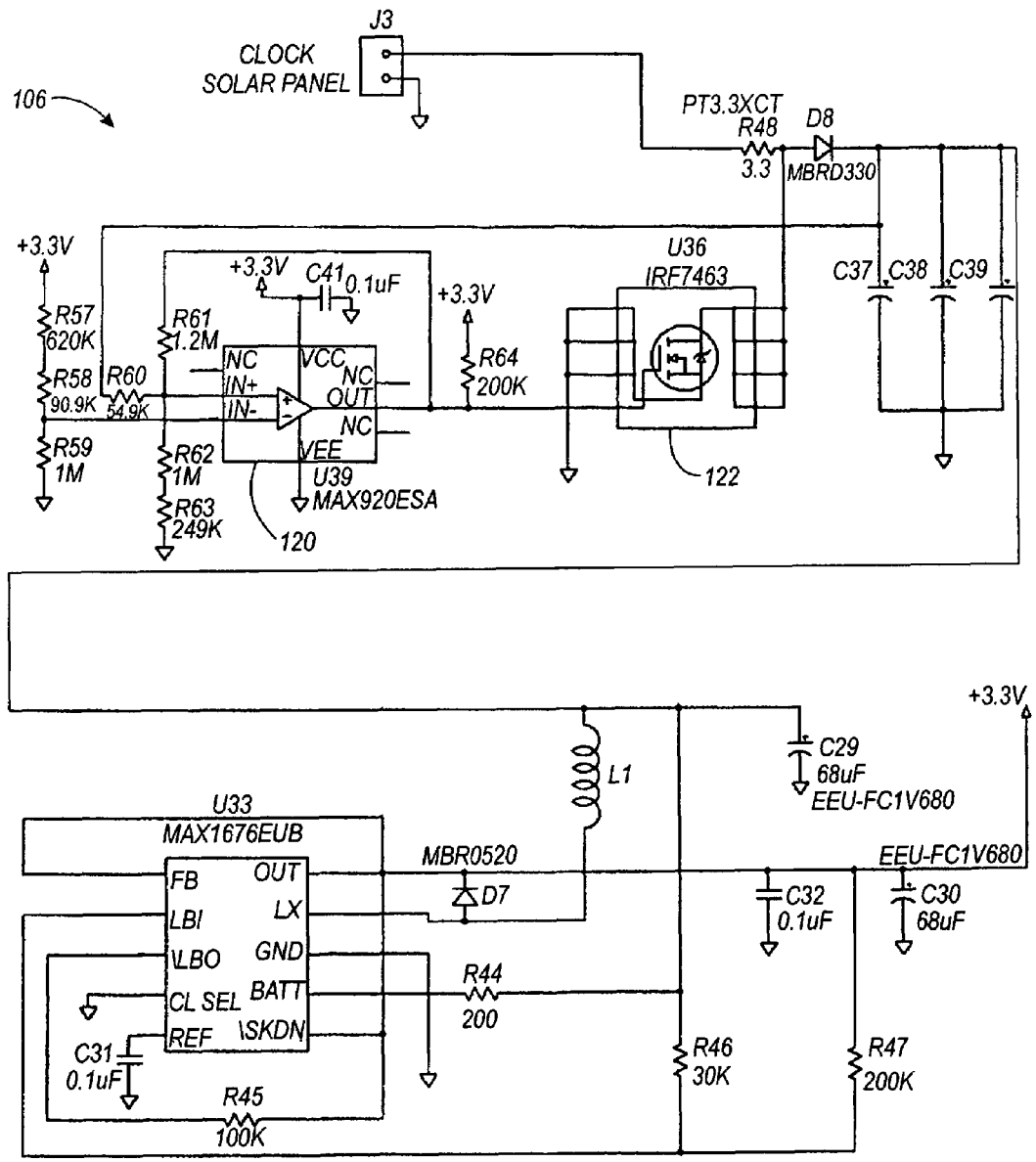
FIG. 10 is a schematic diagram showing an example of charge control circuitry and a DC-DC converter.

FIG. 10 is a schematic diagram showing an example of charge control circuit 106 and DC-DC converter 114. In FIG. 10, connector J3 is shown, which provides a connection to the solar panel 102 (not shown in FIG. 10). The circuit shown protects the capacitor(s) in the capacitive network from being charged beyond their working voltage (e.g., 2.5V for the capacitors described above). Comparator circuitry 120 shunts the solar power through a 3.3 ohm resistor and the mosfet switching device 122 to ground once the voltage across the capacitor(s) nears 2.5V.

When the voltage across the capacitor(s) falls below approx. 2V the comparator turns off the switching device 122 and allows the solar panel to continue charging the capacitor(s) and the cycle repeats. There is some hysteresis designed into the comparator circuit between over voltage threshold and under voltage threshold to prevent oscillating ON and OFF of the switching device 122 near the full charge level. At night when the solar panel is not producing any power, the diode D8 prevents the capacitors from discharging back into the solar panels.

FIG. 10 also shows an example of the DC-DC converter 114. In this example, this section of the schematic shows a switch mode DC to DC conversion circuit. The circuit converts the 1V to 2.5V from the capacitors into a regulated 3.3V for the timer circuitry (digital clock and motor control logic). This circuitry is designed to run all of the time and is over 90% efficient at using almost all of the energy stored within the capacitor(s).

The charge control circuitry 104 for providing power to the motor 116 is similar to that shown in FIG. 10, except that the capacitor configuration uses series and parallel combinations in order to increase the capacitor voltage to 5V. In this example, two series strings are placed in parallel to increase the total capacitance. Using the capacitors described above, each capacitor alone is 100F rated for 2.5V. Two of these capacitors in series make 50F at 5V. Three capacitors in series would make 33.3F at 7.5V and so on. If two of the 50F 5V strings are placed in parallel with each other (as shown in capacitive network 108 in FIG. 9) the total capacitance increases to 100F at 5V. A third string in parallel with that would increase the capacitance to 150F at 5V and so on. Any capacitor type or configuration can be used, as desired. The DC-DC converter 112 may also be slightly different from that shown in FIG. 10. The motor power DC-DC converter 112 is designed specifically for converting the capacitor voltage to the motor's nominal voltage and current requirements. It is also possible to allow the capacitors to drive the motor directly without any DC to DC conversion. However, the rapid change in capacitor voltage during discharge may affect the motor's performance.

Figure 11:
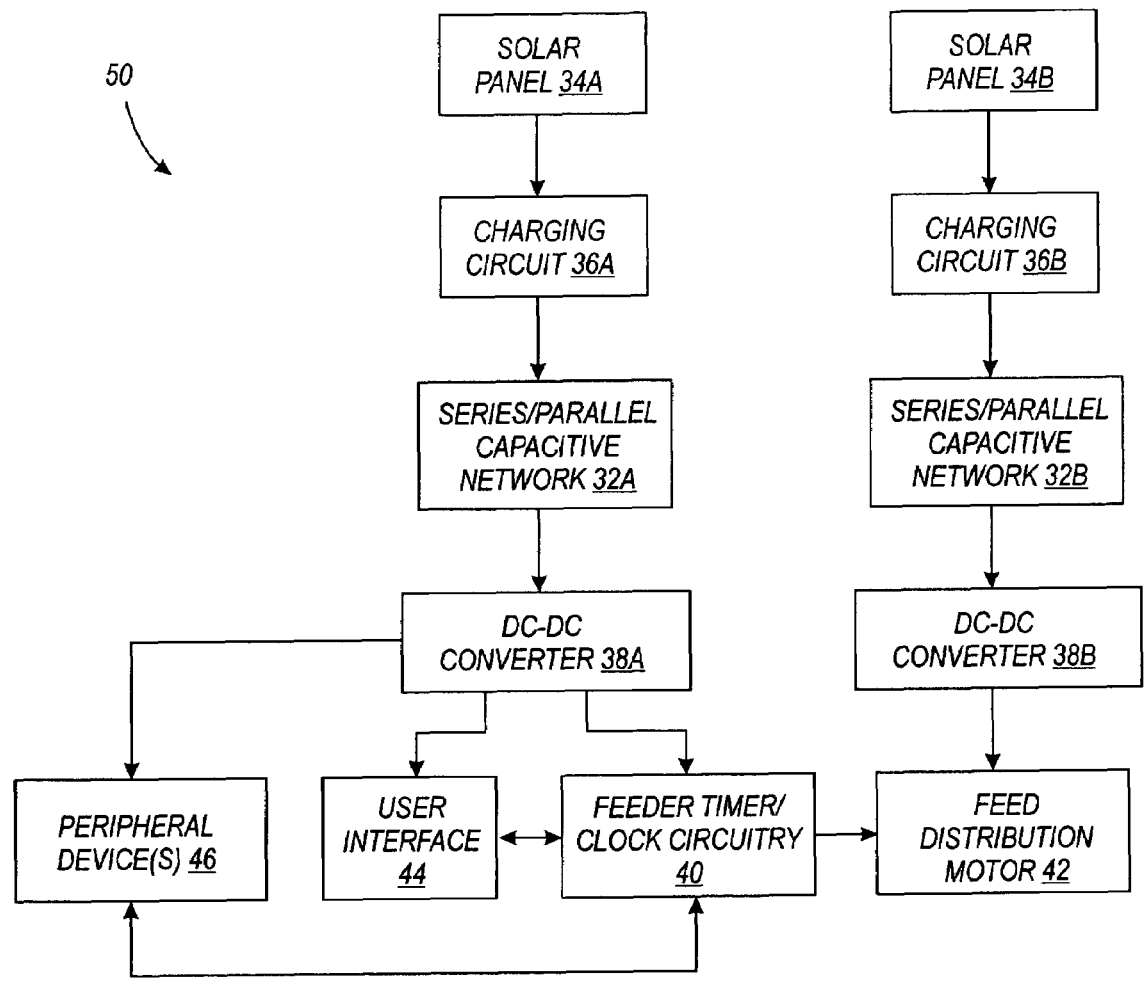
FIGS. 11 and 12 are block diagrams illustrating other embodiments of the present invention.

FIG. 11 is a block diagram illustrating another embodiment of the present invention. FIG. 11 is similar to FIG. 4, with the addition of a peripheral device(s) 46. A peripheral device 46 can be powered in the same manner as the circuitry 40. A peripheral device can be controlled by the circuitry 40, or by any other desired manner. The peripheral device(s) 46 may be comprised of any desired device that can work with a capacitively powered system. In one example a peripheral device 46 is a camera that captures images (e.g., on film, or in a computer readable format) at predefined times, in response to input from a motion sensor, or in response to any other input source. In the example of an automatic feeder system, the camera can capture images of animals that come to eat the food spread by the feeder. In another example, a peripheral device is a wireless communication apparatus, such as a cellular telephone apparatus. In this example, the wireless communication apparatus allows a user to remotely program or control the system. In addition, the wireless communication apparatus can be used to provide system status to a remote user. For example, if used in conjunction with a bin sensor, the wireless communication apparatus can notify a user when the food supply is low or gone. The wireless communication apparatus can also provide alarms to notify a user of detected faults or other conditions. In another example, a peripheral device is an optical sensor. An optical sensor can be used to allow a user to manually operate the system from a distance. In the example of an automatic feeder, a user could use a laser to dispense food from a distance. In another example, a peripheral device is an animal actuated device which could be used as an input to the control circuitry. Such a device could be a switch, lever, motion sensor, etc. In this example, a feeder could be programmed to only dispense food when an animal actuates a the device (e.g., by stepping on or nudging a trigger, or by moving within the range of a motion sensor).

Figure 12:
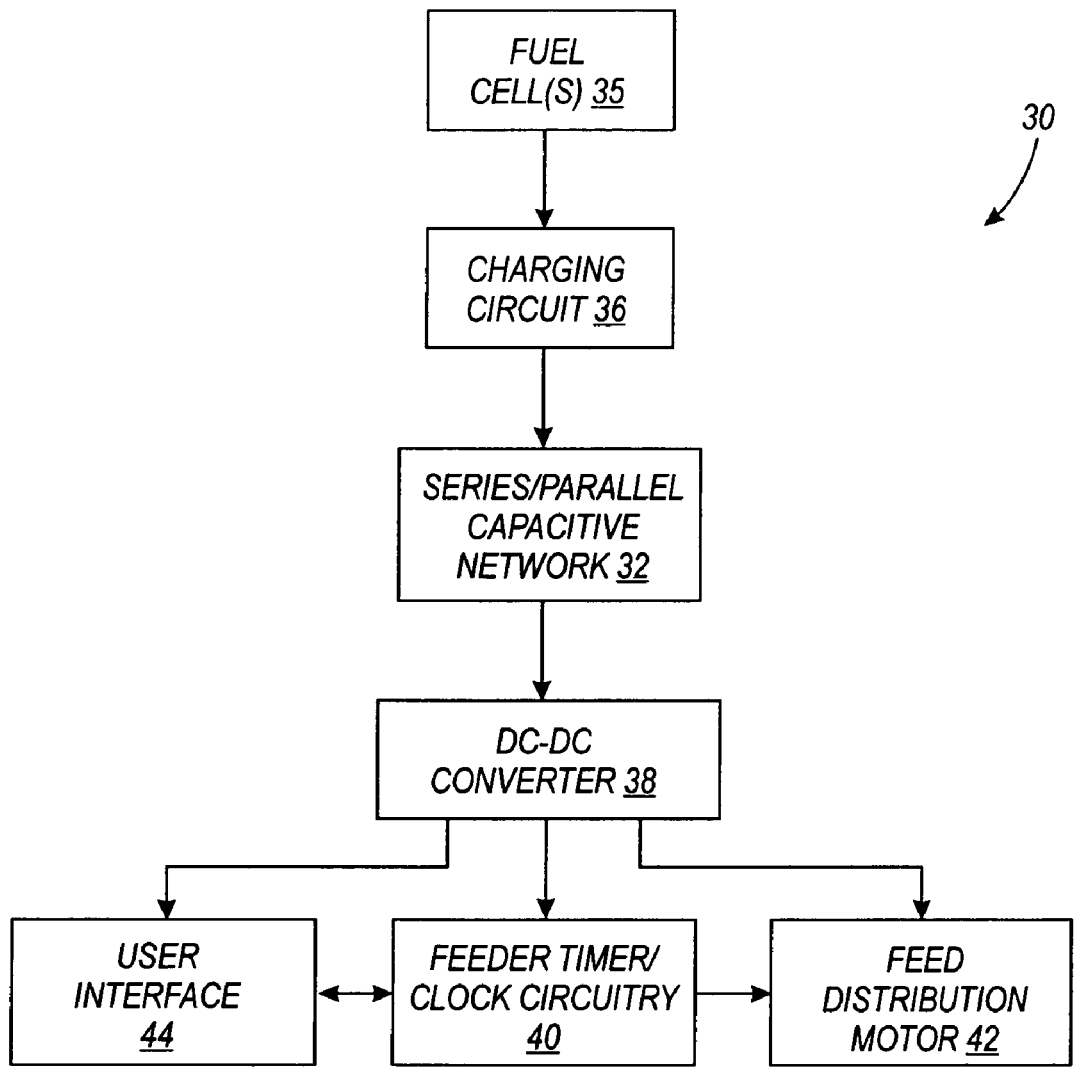

FIG. 12 is a block diagram illustrating another embodiment of the present invention. In the embodiment shown in FIG. 12, the capacitive network 32 is charged using a fuel cell 35. One advantage of this embodiment is that the power to the system is not dependent on sunlight. One disadvantage, compared to using a solar panel, is that a fuel storage device will have to be periodically replenished by a user. In another embodiment, a system can use both solar panels and a fuel cell to provide power to the capacitive network 32. Other embodiments are also possible. For example, a wind generator could be used as a source of energy to charge the capacitive network.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An automatic feeder assembly comprising:
   a feed distribution device;
   control circuitry operatively coupled to the feed distribution device for controlling the operation of the feed distribution device;
   one or more solar panels;
   a first capacitive network having one or more capacitors for storing energy from the one or more solar panels, wherein energy stored in the one or more capacitors of the first capacitive network is used to provide power to the feed distribution device; and a second capacitive network having one or more capacitors for storing energy from the one or more solar panels, wherein energy stored in the one or more capacitors of the second capacitive network is used to provide power to the control circuitry, and wherein the second capacitive network is configured such that it does not provide power to the feed distribution device.

2. The automatic feeder assembly of claim 1, further comprising a DC to DC converter coupled between the second capacitor network and the control circuitry to step up the voltage of the one or more capacitors as the capacitor voltages drop.

3. A method of operating an automatic feeder having a feed storage bin and a feed distribution device, the method comprising:
   providing one or more solar panels;
   storing energy from the one or more solar panels in one or more capacitors;
   at least partially disabling the charging of the one or more capacitors when the voltage of the one or more capacitors reaches a threshold voltage;
   providing control circuitry operatively coupled to the feed distribution device and to the one or more capacitors;
   at one or more predetermined times of day, using the energy stored in the one or more capacitors to provide power to the feed distribution device to distribute feed stored in the feed storage bin, wherein the feed distribution device is powered without using power from a non-photovoltaic power source such as a chemical battery; and
   configuring the control circuitry to prevent the feed distribution device from depleting energy stored in the one or more capacitors below a critical level so that the control circuitry will have enough energy available to sustain full circuit operation, including critical logic operation and timekeeping operation, during time periods when the energy stored in the one or more capacitors is insufficient to maintain operation of both the control circuitry and the feed distribution device during a period of time in which there may be limited amounts of solar energy for charging the capacitors back to a safe and fully operational level.

4. The method of claim 3, further comprising using a DC-DC converter to step the capacitor voltage up or down to provide a desired steady voltage level to the feed distribution device, even as the capacitor voltages fall.

5. An automatic feeder comprising:
   a feed storage bin;
   a feed distribution device;
   one or more solar panels;
   control circuitry operatively coupled to the feed distribution device for controlling the operation of the feed distribution device;
   one or more capacitors for storing energy from the one or more solar panels, wherein energy stored in the one or more capacitors is used to provide power to the control circuitry and the feed distribution device; and
   a charge control circuit coupled to the one or more capacitors and to the one or more solar panels for protecting the one or more capacitors from damaging voltage levels;
   a DC to DC converter coupled between the one or more capacitors and the control circuitry to provide a stepped up voltage relative to the voltage of the one or more capacitors as the capacitor voltages drop so as to provide a continuous, regulated, and uninterrupted useable voltage to the control circuitry while the voltage of the one or more capacitors drops below the usable voltage levels of the control circuitry.

6. The automatic feeder of claim 5, wherein the control circuitry is programmable by a user to activate the feed distribution device at predetermined intervals and durations.

7. The automatic feeder of claim 5, wherein a second DC to DC converter provides a stepped up voltage relative to the voltage of the one or more capacitors as the capacitor voltages drop so as to provide a fixed voltage level to the feed distribution device, even as the voltage of the one or more capacitors drops below the fixed voltage level.

8. The automatic feeder of claim 5, wherein the one or more capacitors comprises first and second separate capacitive networks, wherein the first capacitive network provides power to the control circuitry, and the second capacitive network provides power to the feed distribution device.

9. The automatic feeder of claim 5, wherein the feed distribution device is activated for a time and duration, wherein the control circuitry controls the time and duration that the feed distribution device is activated.

10. The automatic feeder of claim 5, wherein the feed distribution device is powered without using power from a chemical battery.

11. An automatic feeder comprising:
    a feed storage bin;
    a feed distribution device;
    one or more solar panels;
    control circuitry operatively coupled to the feed distribution device for controlling the operation of the feed distribution device;
    one or more capacitors for storing energy from the one or more solar panels, wherein energy stored in the one or more capacitors is used to provide power to the control circuitry and the feed distribution device, wherein the one or more capacitors comprises first and second separate capacitive networks, and wherein the first capacitive network provides power to the control circuitry, and the second capacitive network provides power to the feed distribution device; and
    a DC to DC converter coupled between the one or more capacitors and the control circuitry to provide a stepped up voltage relative to the voltage of the one or more capacitors as the capacitor voltages drop so as to provide a continuous, regulated, and uninterrupted useable voltage to the control circuitry while the voltage of the one or more capacitors drops below the usable voltage levels of the control circuitry.

12. The automatic feeder of claim 11, wherein the feed distribution device is activated for a time and duration, wherein the control circuitry controls the time and duration that the feed distribution device is activated.

13. The automatic feeder of claim 11, wherein the feed distribution device is powered without using power from a chemical battery.

14. The automatic feeder of claim 11, wherein the control circuitry is programmable by a user to activate the feed distribution device at predetermined intervals and durations.

15. The automatic feeder of claim 11, wherein a second DC to DC converter provides a stepped up voltage relative to the voltage of the one or more capacitors as the capacitor voltages drop so as to provide a fixed voltage level to the feed distribution device, even as the voltage of the one or more capacitors drops below the fixed voltage level.

16. The automatic feeder of claim 11, further comprising a charge control circuit coupled to the one or more capacitors and to the one or more solar panels for protecting the one or more capacitors from damaging voltage levels.

17. A method of operating an automatic feeder having a feed storage bin and a feed distribution device, the method comprising:
- providing one or more solar panels;
- storing energy from the one or more solar panels in one or more capacitors;
- providing control circuitry operatively coupled to the feed distribution device and to the one or more capacitors;
- at one or more predetermined times of day, using the energy stored in the one or more capacitors to provide power to the feed distribution device to distribute feed stored in the feed storage bin, wherein the feed distribution device is powered without using power from a non-photovoltaic power source such as a chemical battery;
- using a DC-DC converter to step the capacitor voltage up or down to provide a desired steady voltage level to the feed distribution device, even as the capacitor voltages fall; and
- configuring the control circuitry to prevent the feed distribution device from depleting energy stored in the one or more capacitors below a critical level so that the control circuitry will have enough energy available to sustain full circuit operation, including critical logic operation and timekeeping operation, during time periods when the energy stored in the one or more capacitors is insufficient to maintain operation of both the control circuitry and the feed distribution device during a period of time in which there may be limited amounts of solar energy for charging the capacitors back to a safe and fully operational level.

18. The method of claim 17, further comprising at least partially disabling the charging of the one or more capacitors when the voltage of the one or more capacitors reaches a threshold voltage.

* * * * *